United States Patent [19]
Durand-Vienne

[11] 3,963,907
[45] June 15, 1976

[54] DEVICE FOR INSTANTANEOUS DECIMAL CREDIBILITY CHECK FOR DATA PROCESSING

[75] Inventor: Robert Rene Durand-Vienne, Noisy-le-Roi, France

[73] Assignee: Agence Nationale de Valorisation de la Recherche (ANVAR), France

[22] Filed: July 2, 1974

[21] Appl. No.: 485,146

[30] Foreign Application Priority Data
July 3, 1973 France .............................. 73.24393

[52] U.S. Cl. ............................ 235/153 B; 235/152
[51] Int. Cl.² ........................................ G06F 11/00
[58] Field of Search ........ 235/153 B, 153 A, 153 R, 235/152, 156; 340/172.5

[56] References Cited
UNITED STATES PATENTS
3,265,874  8/1966  Soule, Jr. et al. ................ 235/153 B
3,711,690  8/1971  Osborne .......................... 235/153 B

*Primary Examiner*—Charles E. Atkinson
*Attorney, Agent, or Firm*—Robert E. Burns; Emmanuel J. Lobato; Bruce L. Adams

[57] ABSTRACT

This instantaneous decimal credibility check device enables the operator of a terminal to send out, by means of this terminal, numerical data, the decimal value of which will have been previously checked.

It is characterized in that it comprises a decimal positioning computer CCD connected to decoders DEC of the program memory M1 and to the keyboard CG for the purpose of receiving information therefrom and driving bistable triggers BS for guiding the keys of the keyboard. The decimal positioning computer is also connected, on the one hand directly to a space codes emitter ECE and decimal point emitter EPtD, and, on the other hand indirectly through certain of the guidance bistable triggers, to the "flag" character emitter ECV. A blind code emitter ECAV is directly connected to a decoder DEC of the instruction character ICAV corresponding to the number $n$ of blind codes. A principal memory stores the numerical data, blind codes, space codes and flag characters.

Applicable to data acquisition terminals or to any data processing or remote data processing apparatus having a numerical keyboard.

3 Claims, 3 Drawing Figures

DEVICE FOR INSTANTANEOUS DECIMAL CREDIBILITY CHECK FOR DATA PROCESSING

BACKGROUND OF THE INVENTION

The present invention relates to a device for instantaneous decimal credibility check for data acquisition terminals or for any data processing or remote data processing apparatus fitted with numerical key board.

Up till now, this problem has been resolved only for the case of treatment by "lots", the check being carried out either by double striking by two different operators, or by the preliminary addition of the movements of data to be checked and the formation of checking totals or sub-totals, or again by "pre-ventilation" consisting of breaking down, in advance, each movement into its constituent elements (for example: total sum, net sum exclusive of taxes and taxes) and of carrying out the check by null proof.

However, where isolated movements (a gate transaction for example) are involved and/or movements to be subjected to instantaneous treatments (in real time), none of the conventional methods indicated above can be applied, and it is only possible to carry out a capacity overload check, with the result that all the data comprised between zero and the maximum capacity of the operand provided by the programme are acceptable. This results in a high risk of error, with the annoying and troublesome consequences which this implies, the strongest perturbations arising from errors in the decimal point, that is to say the shifting of the decimal point (real or virtual).

With the continuing extension of computers operating in "real time" or "instantaneous mode", it is becoming of primary importance to be able to eliminate this type of error.

The present invention has as its objective the provision of a device enabling the operator of a terminal to send out, using this terminal, "movements" having a decimal value which has been checked in advance.

SUMMARY OF THE INVENTION

For this purpose, this instantaneous decimal credibility check device for data acquisition terminals (or for any data processing or remote data processing equipment fitted with a numerical key board), comprises a programme memory into which a programme is introduced and which consists of a sequence of instruction characters, decoders for these various instruction characters, a principal memory in which the data to be acquired is recorded, and four service character transmitters. The service character transmitters include a first transmitter of $n$ blind codes intended for automatically filling the $n$ upper positions of the principal memory, a second transmitter of $p$ prefixed space codes placed in the $p$ positions of the memory which follow the $n$ positions which receive the blind codes, a third transmitter of a decimal point character and a fourth transmitter of an authenticating or "flag" character, these four transmitters being together connected to the input of the principal memory. An acquisition key board, is characterised in that it comprises a decimal centering computer connected to the decoders of the programme memory and to the keyboard for the purpose of receiving information therefrom and of piloting bistable triggers for guiding the keys of the keyboard and also connected on the one hand, directly to the space codes transmitter and decimal point transmitter and, on the other hand, indirectly to the "flag" character transmitter, the blind codes transmitter being itself directly connected to the decoder of the "blind codes" instruction character. The bistable triggers of the decimal centering computer send out respectively from their outputs prohibition and authorization signal states applied to circuits operated by the contacts of the keyboard so as to switch these contacts towards an alert signal in the first case or towards the execution of their function in the second case, and in that some of the bistable triggers BS are subjected to bits detector circuits which permanently explore the penultimate position of the principal memory M2.

BRIEF DESCRIPTION OF THE DRAWINGS

There is described below, as a non-limiting example, a form of embodiment of the present invention with reference to the attached drawing, in which.

DESCRIPTION OF PREFERRED EMBODIMENT

Figure 1:
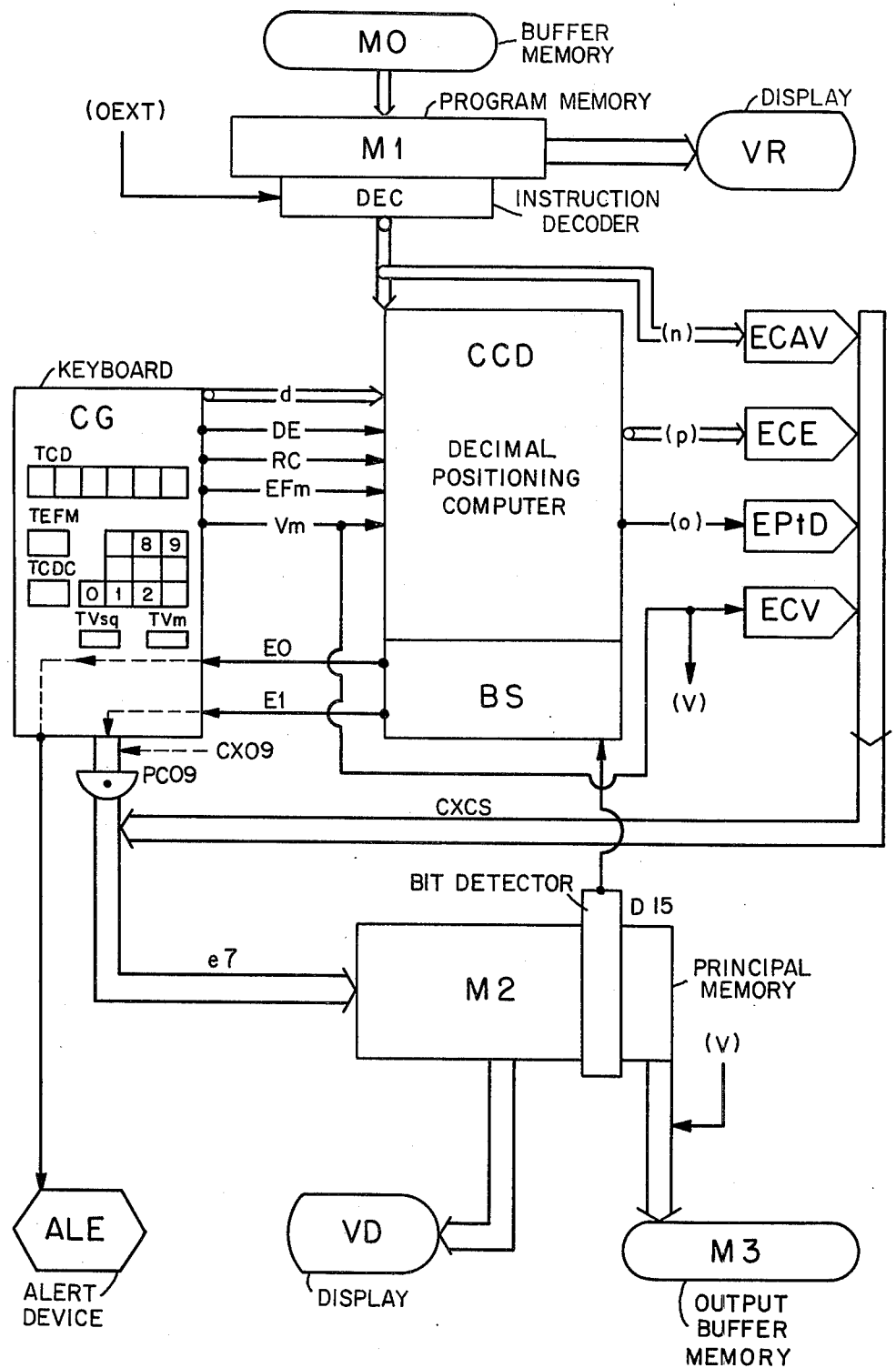
FIG. 1 is a synoptic diagram of the entire instantaneous decimal credibility check device according to the invention.

A description is first given, with reference to FIG. 1, of the essential elements of the device according to the invention. This device comprises four memories, that is a memory M0 constituting an entry buffer for a programme, a programme memory M1, a principal memory M2 and an output buffer memory M3.

The device according to the invention is associated with a terminal. This terminal may supply the programme recorded in the entry buffer memory M0 or alternatively the programme can be supplied from an independent programme source in association with a reader, such as a magnetic tape reader, punch card reader and so on.

Figure 2A:
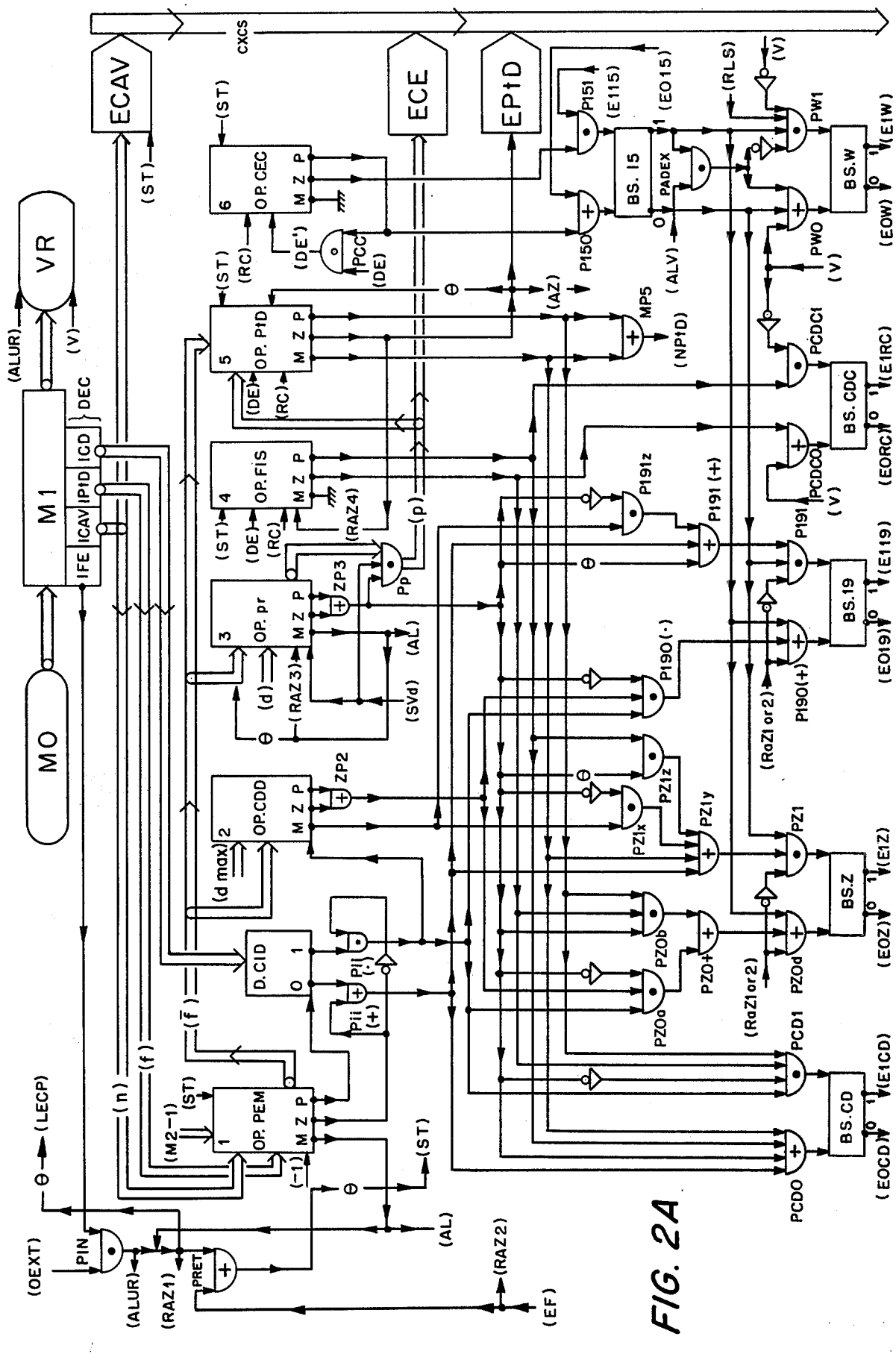
FIGS. 2a and 2b, the elements of which should be connected together in accordance with the references given in parentheses, constitute the electrical and logic diagram of all the circuits of the device.

The programme supplied into the memory M0 is then transfered as will be seen later to the programme memory M1. The programme recorded in the memory contains special characters which have very exact meanings and which enter into the operation of the device, that is a first character IFE, acting as a sentinel or marker to separate the words of the programme from one another, a character ICAV corresponding to a "blind codes" instruction the function of which will be defined later, a character IPTD corresponding to a "decimal point" instruction, a character ICD corresponding to a "decimal centering authorised" instruction, and finally an optional portion "R" (record) which is intended to be sent to a visualisation or display apparatus. The record corresponds to the identification in plain language of the data to be acquired. This identification is thus rendered capable of being read by the operator on the visualisation screen (VR. FIGS. 1 and 2a).

The instruction characters from the memory M1 are decoded by suitable decoders DEC which are of well known type and are fed to a decimal centering computer CCD, which will be described later on in more detail. This decimal centering or positioning computer CCD controls the bistable memories BS for guiding the contacts of a guider or control keyboard CG. The decimal centering computer CCD directly or indirectly controls four service characters transmitters, that is to say a "blind codes" transmitter ECAV, a "spaced codes" transmitter ECE, a "decimal point" transmitter EPTD, and an authenticating or "flag" characters transmitter ECV.

The bistable guidance memories indicated as a whole by BS in FIG. 1 and in detail by BS.CD; BS.Z; BS.19; BS.CDC; BS.W; BS.15 in FIG. 2a (perhaps also BSEF) send out from their outputs electrical states 1 or 0 corresponding respectively to authorization or prohibition. These states are applied to the guider keyboard in a way which will be described later. This keyboard comprises five principal categories of keys, as follows: (1) decimal centering or positioning keys TCD for calling up units, tens, hundreds etc . . . (2) 0 keys and possibly also double 0 key, (3) numerical keys from 1 to 9, 4) correction keys TCDC (corrections of last characters) and TEFM (deletion of words), and (5) enabling keys TVm (authentication of words) and TVSq (enabling of sequences). Other keys for auxiliary functions (fixed or variable format, jumping of optional words, etc.) may also be provided on the keyboard.

In FIG. 1, RC, EFM and VM represent respectively the pulses coming from the correction keys TCDC, the deletion key TEFM and the enabling key TVm. DE indicates the pulses coming from the whole of the numerical keys, including the 0 key, and finally $d$ designates the binary value emitted from the selected decimal centering key TCD. E0 and E1 represent respectively the prohibition and authorization states emitted by the guidance bistables BS and sent to the commutation circuits of the corresponding keys.

The numerical characters transmitted by the guidance key CG are sent by the latter through a channel CX09 which is controlled by an assembly of gates ET:PC09, the outputs of which are connected to a channel E7 leading to the input of the principal memory M2. To this channel E7 there is also connected another channel CXCS in which are grouped the outputs from the various transmitters ECAV, ECE, EPTD and ECV.

The guidance key CG is also connected to an alert device ALE which is actuated, as will be seen later, as soon as any prohibition key has been pressed.

The principal memory M2 therefore receives the data required by the the guidance key CG and transmits these data after final enabling (V) to the output buffer memory M3.

The contents of the principal memory M2 can be examined at any time, by means of an optional display apparatus VD of known type connected to this memory.

Associated with the memory M2 is a circuit D15 detecting the presence or absence of a bit at position 15 of the memory. This circuit is connected to the guidance bistable (BS15) as discussed later.

The circuit detecting the presence or absence of a bit is associated with position 15 of the memory, in the case where this memory comprises 16 positions and where the data is written in succession in the memory M2 from left to right, (the extreme left position being position 1 and the extreme right position being position 16). The memory M2 could, if desired, operate in the opposite direction and, in such a case, the detection circuit for detecting the presence or absence of a bit would be associated with position 2, that is to say always with the next to last but one memory position in the direction of writing.

A description will now be given, with reference to FIGS. 2a and 2b, as joined together in the way already described, of the entirety of the circuits of the device according to this invention.

In order to facilitate the description of the structure and operation of the present invention, certain terminology will now be defined. A space code is a bit configuration corresponding to a "blank" character or the absence of a character. Space codes are used as prefixes to numerical characters and the number of prefix space codes can be selected to determine the position of a numerical character relative to the decimal point. A blind code is a bit configuration used to fill a memory position and the number of blind codes stored in a memory is selected so that the remaining memory content is sufficient to store the operand plus a flag character. Blind codes are not transmitted from a memory along with an operand. A flag character is a bit configuration which is apended after the last character of a word and serves to separate successive words.

In the logic diagram shown in these figures, the AND gates (logic product) are represented by semi-circles containing a ".", and the OR gates (logic sum) are represented by semi-circles containing a "+" sign, inverters are represented by small triangles preceded by a small circle, the bistable triggers BS are represented by rectangles with 0 and 1 outputs at the bottom and corresponding 0 and 1 inputs at the top edge, and delay circuits are represented by the Greek letter $\theta$. Connections are represented either by single lines where binary pulses or states are involved, or by double lines for transmission of bits in parallel (digits).

The decimal centering computer CCD comprises six operators designated by OP.PEM (operator for Maximum Whole Portion), OP.CCD (Decimal Overload Check operator), OP.pr (operator for calculating $p$ the number of *prefixed* space codes defined later), OP.FIS (operator for detection of Significant Initial Striking), OP.PtD (operator for emitting of Decimal Point), OP.CEC (operator for Correction during Course), and a decimal instruction check detector D.CID. Each of these operators calculates results (from pure binary values applied at its input), upon which logic tests relative to 0 are systematically carried out. The result of the tests on the results appears at the terminals M, Z, P of each operator, that is at terminal M if the result is less than zero, at terminal Z if it is equal to zero, at terminal P if it is greater than zero. For each operator, these terminals are shown respectively from left to right.

In the explanations to be given below, $n$ will be used to designate the number of blind codes which are characters emitted in order automatically to fill the $n$ upper positions of the memory, so that the available memory zone remaining corresponds to the capacity of the operand (equal to 15 - $n$, since the memory possesses 16 positions, one of which, the sixteenth, is reserved for the flag characters CVm which are used for separating words).

$p$ will be used to designate the number of prefixed space codes placed in the $p$ positions of the memory following the $n$ positions which receive the blind codes, the spaces being intended for ensuring decimal centering of the acquisition zone.

$d$ will be used to designate the number of positions in the memory following the $p$ space codes and reserved for the entire theoretical portion of the data to be acquired, "PtD" the real position of the decimal point, and finally $f$ the number of positions of the memory reserved for the fractional portion of the data to be acquired. Finally, the sixteenth position is the position reserved for the "flag" character as already seen above.

$\bar{f}$ also denotes the maximum capacity of the entire portion of the data to be acquired, which is equal by definition to the sum of the number $p$ of the space codes and of the number $d$ of memory positions reserved for the theoretical entire portion $(\bar{f} = p + d)$.

To summarise, if M2 is used to denote the capacity of the corresponding memory, then the following relationship holds:

$$n + p + d + f + 1 = M2 - 1. \qquad \text{Equation A}$$

When the device starts to function, the programme memory M1 contains four instruction characters corresponding to instructions IFE, ICAV, IPtD, ICD. These four instructions characters are situated in four different memory positions and are read and interpreted by corresponding decoders indicated by DEC in FIG. 2a. The decoder for the instruction IFE is connected to one of the inputs of an AND gate: PIN, the other input of which receives an external instruction OEXT. At this instant, the gate emits a signal, indicated by ALUR, which may be used to illuminate a display apparatus (VR) and which, as signal RAZ1, is used to restore all the operators, all the bistables and the memory M2 to zero. This signal also supplies an exploration signal LECP for exploring the remainder of the programme, this signal being transmitted to the three decoders for: ICAV, IPTD, ICD for enabling these decoders, after passing through its delay theta.

The output signal from the gate PIN is also applied to an input of an OR gate: PRET, the other input of which receives a signal EF coming from the eraser key TEFM via the AND gate: PEF. The input signal to the gate PRET is also a general re-set to zero signal RAZ2 applied to all the operators, except for the first OP.PEM, to the memory M2, and a signal RaZG applied to the bistable triggers BS and possibly also to the display apparatus VD, which will be discussed below.

The output signal from the gate PRET also constitutes an enabling signal ST which is applied to the operators OP.PEM, OP.PtD, OP.FIS, and OP.CEC, to the emitter ECAV and to the display apparatus VD connected to M2.

The first operator OP.PEM (operator for calculating the maximum entire portion) receives at its inputs a fixed constant equal to: M2 − 1, the capacity of the memory diminished by one unit, (that is to say 15 in the present case), having a positive value, and secondly the value $n$ coming from the blind codes instruction decoder ICAV (negative value), and thirdly the value $f$ provided by the decoder IPtD, having a negative value, and forthly, if $f \neq 0$, the operator receives the value (−1). The operator OP.PEM therefore carries out the following algebraic summation: $M2 - 1 - n - f - 1 = \bar{f}$.

The result thus obtained $(\bar{f})$ is applied to the inputs of the operators OP.CDD, OPpr and OP.PtD. At the same time, the blind code detector DEC/ICAV applies the value $n$ of the blind code to the blind code emitter ECAV, which emits the $n$ blind codes which are transmitted by the channels CXCS and E7 to the memory M2, where they occupy $n$ first positions, after enabling of EVAV by the signal ST.

In addition, the result $(\bar{f})$ is tested and, depending upon whether this result is less than, equal to or greater than zero, a signal appears at the output terminal M, Z or P. If the signal is present at terminal M, it constitutes an alert signal AL which is applied to an OR alert gate PAL connected to the alert device ALE to indicate an error. In parallel, the signal at terminal M is applied to the output from the gate PIN to assume the functions already seen upstream of the signal ALUR. The (incompatible) programme is decoded again and if the error re-commences, the programme is again rejected.

If the signal appears at the Z terminal of the operator OP.PEM, this means that there is no whole portion and that the acquisition will have an entirely fractional form. The signal Z is applied directly to an input of an OR gate: PII(+) and, through the intermediary of an inverter, to an input of an AND gate: PII(.).

The signal appearing at terminal P is applied to the input of the decoder DCID, which it enables.

This decoder DCID receives at its input a signal coming from the decoder of the decimal centering instruction ICD. This decoder comprises two outputs 0 and 1 respectively connected to the second input of the OR gate: PII(+) and the second input of the AND gate: PII(.). The output signal from the gate PII(+) is applied to an input of an OR gate: PCD0, the output of which is connected to the input drive 0 of a bistable trigger BS.CD (decimal centering trigger), and to an input of an OR gate: PZ1y, itself connected to the input drive 1 of a trigger BS.Z (trigger of the 0 key), via an AND gate: PZ1. The signal coming from the gate PII(+) is also applied to an input of an OR gate: P191(+) the output of which is connected to an imput of an AND gate: P191. The output from the latter is connected to the input drive of a trigger BS.19 (trigger for the numerical keys 1 to 9).

The output signal from the gate PII(.) is applied to an input of an AND gate: PCD1, the output of which is connected to the input drive 1 of the trigger BSCD, to an input of an AND gate: PZ0a, the output of which is connected to an input of an OR gate: PZ0(+), the output of the latter gate being connected, via an OR gate: PZ0d, to the input 0 of the trigger BS.Z.

The ouput of the gate PII(.) is also connected to an input of an AND gate: P190(.), the output of which is connected, via an OR gate: P190(+) to the input drive 0 of the trigger BS.19. The output from the gate PII(.) is also connected to the operator OP.CDD so as to apply to the latter an enabling signal.

This operator OP.CDD receives through fixed cabling a constant "$d - max$" of positive value. This constant represents the value of the decimal centering key TCD of highest rank (for example six if there are six keys, the sixth of which corresponds to the hundreds of thousands rank, the first corresponding to units).

The operator OP.CDD also receives, as a negative value, the value $(\bar{f})$ emitted by the operator OP.PEM and calculates $(d\text{max}-\bar{f})$. This result is tested relative to zero and the signal appearing at terminal M is applied to one input of an AND gate: PZ1x the output of which is connected to an input of the OR gate: PZ1y. This signal, passing through the AND gate: Pz1, is transmitted to the input drive 1 of the trigger BS.Z. The signal M is also applied to an input of an AND gate: P191x and from there to the input drive 1 of the trigger BS.19 through the gates P191(+) and P191. The terminals Z and P of the operator OP.CDD are connected together to the inputs of an OR gate: ZP2, the output of which is connected to an input of the AND gate: PZ0a and to an input of the gate P190(.), the output of which is connected via the gate P190+ to the input drive 0 of the trigger BS.19. as already seen above.

The third operator OP.pr receives at its input the value $(\bar{f})$ calculated by the first operator OP.PEM, with a positive value. It also receives, as a negative value, the value "d" which is transmitted through the channel CXd, from a decimal check key TCD, as will be seen below. The operator OP.pr carries out the algebraic summation: $(\bar{f}-d=p)$. This result passes through the AND gates: Pp and is sent on the one hand to the operator OP.PtD and on the other hand to the space codes emitter ECE. The $p$ space codes are then sent by this emitter through the channel CXCS and the channel E7, to the memory M2.

In addition, the operator OP.pr carries out the test of the result $p$ with respect to zero. The test enabling signal (SVd) comes from a gate PVd (FIG. 2b). The terminal M of the operator is connected to the OR alert gate PAL and also to the restore to zero input of the operator RaZ3 and, after delay, indicated by $\theta$, it instructs the re-entry of the value $(\bar{f})$. The operator can then re-commence to press on another decimal centering key TCD.

The terminals Z and P are connected together to the input of an OR gate: ZP3, the output of which is connected to the second inputs of the AND gates: Pp, which receive at third inputs the test enabling signal (SVd). The output of the gate ZP3 is also connected to the following gates: OR gate: PCD0, AND gate: PCD1 (through the intermediary of an inverter), AND gate: PZ0a, (through the intermediary of an inverter), AND gate: PZ0b, the output of which is connected to an input of the OR gate PZ0(+), AND gate: PZ1x, (through the intermediary of an inverter), AND gate: PZ1z through the intermediary of a delay device $\theta$, the output from which gate is connected to an input of the OR gate: Pz1y; AND gate; P191x by means of an inverter; to the AND gate: P190(.) through an inverter, and to the OR gate: 191 (+) through a delay theta.

The fourth operator OP.FIS (significant initial striking detection operator) receives at its inputs pulses DE, of positive value, coming from two AND gates: PIDE and PCOO (FIG. 2b), and, in addition, pulses RC, of negative value coming from the gate PRC. The operator carries out the algebraic binary summation: $\Sigma DE - \Sigma RC$. Start of a test is given by the signal ST, as already indicated above. The output M is not used and the output Z is connected to the following gates: AND gate: PCD1; PZ0b; OR gate: PCDC0, the output of which is connected to the input drive 0 of the trigger BS.CDC (guidance trigger for the correction key for the last characters).

The terminal P of the operator OP.FIS is connected to the following gates: OR gate: PCD0; AND gate: PZ1z; AND gate: PCDC1, the output of which is connected to the input drive 1 of the trigger BS.CDC.

The fifth operator OP.PtD (decimal point emission operator) receives at its inputs the positive value $(\bar{f})$, the negative value $(p)$ coming from the gate Pp, the pulses DE of negative value, the pulses RC, of positive value (coming from the gate PRC), and finally the value (−1) coming from the test output Z of this same operator, after passing through a delay device 0.

The operator OP.PtD calculates the function: $(\bar{f}-p-\Sigma DE+\Sigma RC)$.

The terminal M of the operator OPPtD is connected to the following gates: PCD0, PZ1y, and through an OR gate: MP5, to the gates PIDE, PCOO and PC09 (FIG. 2b), all of the AND type.

The terminal Z of the operator OPPtD sends out a restore to zero signal RaZ4 for the operator OP.FIS and is connected (signal AZ) to the gates: PA0+ PA19+, to the input (−1) of the same operator as already seen above, and finally to the decimal point emitter EPtD. This emitter sends the character corresponding to the decimal point along the channels CXCS followed by E7, to the memory M2.

The terminal P of the operator OPPtD is connected to the following gates: AND gate: PZ0b, AND gate: PCD1 and OR gate: MP5.

The sixth operator OP.CEC (operator for corrections during running) receives as a positive value at one of its inputs pulses RC coming from the gate PRC and, as negative value, pulses DE coming from an AND gate: PCC. One input to this AND gate is connected to the output P of this same operator, while the other input of this gate is connected to the outputs of the gates PIDE and PCOO (and receives pulses DE).

The operator OP.CEC calculates the function $\Sigma RC - \Sigma DE' = \gamma$, where $DE' = 0$ if $\gamma$ 0 $DE' = 1$ if $\gamma > 0$. The test of the result is enabled by the signal ST and if the result is equal to zero, the terminal Z emits a signal applied to one input of an AND gate: P151, the output of which is connected to the input drive 1 of a trigger BS15.

The output P of the operator OP.CEC is connected on the one hand to one input of the gate PCC and on the other hand to one input of an OR gate: P150, the output of which is connected to the input drive 0 of the trigger BS.15.

The detector D15 detecting the presence or absence of a bit in position 15 of memory M2 emits a permanent signal at its output 0 while a bit is absent and a signal at its output 1 while a bit is present. These states E0/15 and E1/15 are respectively applied to the second inputs of the OR gate: P150 and of the AND gate: P151.

The outputs 0 and 1 of the trigger BS.15 are connected respectively to the input drives 0 and 1 of a trigger BS.W, through the intermediary of an OR gate: PWO and of an AND gate: PW1. These outputs are also connected: the output 0 to the inputs of gates PZ1 and P191 and the output 1 to the inputs of gates PZ0d and P190+. The trigger BS.W serves for guiding the commutation of the enabling key TVM. An AND gate: PADEX receives at its two inputs, on the one hand the alert signal ALV issuing from the gate PAL and, on the other hand, the signal coming from output 1 of the trigger BS15. The output of the gate PADEX is connected on the one hand directly to one input of the OR gate: PWO and on the other hand, through the intermediary of an inverter to one input of the AND gate: PW1. The OR gate: PWO comprises a third input which is connected to the output of the gate PVC (signal V), which is also connected to one other input of the AND gate: PW1, through the intermediary of an inverter. Similarly, the output of the gate PVC is conncted to the inputs of the gates PCDC0 and PCDC1, directly to the first of these and through the intermediary of an inverter to PCDC1.

The restoring to zero of the various bistable triggers BS is carried out by the general re-set to zero signal RaZ1 or 2, which is applied directly to the OR input gates 0 and also, through the intermediary of an inverter, to the AND input gate 1 of each bistable. This assembly is illustrated solely for the triggers BS.Z and BS.19.

The bistable triggers guide the commutation of the keys of the guider keyboard CG, either towards the commencememt of the common alert circuit, or to their various specific functions, the latter by virtue of the following cabled logic structures:

The decimal centering keys TCD (FIG. 2b) operate double contacts, one of which leads to a common line connected to one input of the AND gates: PAd and PVd, and the other of which is connected respectively to binary coding matrices $d1, d2 \ldots d6$, for sending out respectively the binary values $1, 2, \ldots 6$, to identify the decimal centering keys actuated. The binary values sent out in this way by these matrices are transmitted through the channel CXd to the operator OP.pr, as has already been seen above.

The second inputs of the AND gates: PAd and PVd are connected respectively to the outputs 0 and 1 of the trigger BS.CD. The output PAd sends out an alert signal AL directed towards the gate PAL, while the gate PVd sends out a test enabling signal (SVd) applied to the operator OP.pr and to Pp, as already seen above.

The numerical key 0 controls a double contact, connected on the one hand to one input of an AND gate: PA0(.) and, on the other hand, to one input of the AND gate: PCOO. The other input of the AND gate: PA0 is connected to the output of an OR gate: PA0+, which receives at its two inputs respectively the signal E0Z coming from the output 0 of the trigger BSZ and the signal AZ coming from the output Z of the operator OP.PtD. The output of the gate PA0(.) is connected to one of the inputs of the gate PAL.

The AND gate: PCOO receives, at two other inputs, the signals coming from, on the one hand the output 1 of the trigger BSZ (signal E1Z) and on the other hand the signal coming from the OR gate: MP5 (signal NPtD). The output of the gate PCOO is connected to an emission matrix C0 which emits the character 0 on four lines in parallel. In addition, the output of this gate sends out the pulse DE directed towards the operators (OP.FIS, OP.P+D, OP, CEC), as we have already seen.

Eachh of the numerical keys 1 to 9 operates a double contact connected on the one hand to a common line connected to first inputs of the two AND gates: PA19(.) and PIDE, and on the other hand to respective coding matrices $C1 \ldots C9$, which send out coded characters on the four lines to which the matrix C0 is connected. These four lines constitute the channel CXO9.

The other input of the gate PA19(.) is connected to the output of an OR gate: PA19(+), the two inputs of which receive respectively signals coming from the output 0 of the trigger BS.19 (signal EO19) and from the gate MP5 (signal AZ). The output of the gate PA19(.) is connected to the alert gate PAL.

The AND gate: PIDE receives at two other inputs, the states coming respectively from the output 1 of the trigger BS19 (signal E119) and from the gate MP5 (signal NPtD). The gate PIDE sends out the signal DE applied to the operators OP.FIS, OP.PtD, OP.CEC, (via the gate PCC), as we have already seen.

On each of the paths of the channel CXO9, there is disposed an AND gate such as PCO9, two inputs of which receive the two aforementioned signals while a third input receives a signal coming from the particular selected line of the channel. The outputs from the four gates PCO9 are connected in parallel to four lines of the channel E7 leading to the memory M2, the channel CXCS being connected into this channel.

The character correction key TCDC operates a contact connected to first inputs of two AND gates: PAC and PRC. The second inputs of these gates are connected respectively to the outputs 0 and 1 of the trigger BS.CdC. The output of the gate PAC (signal AL) is connected to the gate PAL, while that of the gate PRC (signal RC) is connected on the one hand to the three operators OP.FIS, OP.PtD and OP.CEC, and on the other hand to a retrocursor device RCr which instructs the rearward shifting in the memory M2 or the backward displacement of a virtual cursor.

The word enabling key TVm operates a contact connected to first inputs of two AND gates: PAW and PCV, the second inputs of which are connected respectively to the outputs 0 and 1 of the trigger BS.W. The output of the AND gate: PAW (signal AL) is connected to the gate PAL. In addition, the output of the gate PCV is directly connected to the enabling character emitter ECV, which thus sends out a code corresponding to an enabling character passing through the channel CXCS and the channel E7 towards the memory M2.

The output signal of the gate PCV is also used for other purposes, including the advancing of the programme into the memory M1 from M0, the transference of the contents of the memory M2 into the buffer memory M3 and from the latter into the terminal support. The output signal of the gate PCV is also used for retrieving the programme from the "master" terminal or for continuing the principal programme from CIVD.

This signal also acts upon the bistable BS.W, by re-entering directly through the gate PW0 and through an inverter through the gate PW1.

The word erasing key TEFM operates a contact connected to the first inputs of two AND gates: PEF, PAEF. The second inputs of these gates can be connected respectively to two positions, the running position DM and the stop position DA of a commutator associated with a display device VD, connected to the memory M2 in order to display the contents of this memory. The output of the gate PEF is connected to one of the inputs of the gate PRET, while that of the gate PAEF is connected to one of the inputs of the alert gate PAL.

Where there is no display VD (optional), the second inputs of the gates PAEF and PEF are connected respectively to the outputs 0 and 1 of an auxiliary bistable BS.EF. The input drives of this bistable are connected respectively to the output of the gate P.CV (signal V) for receiving instruction 0 and to the output of the gate PRET (signal ST) for receiving instruction 1.

In addition, and optionally, the outputs 1 of the bistables BS can be connected to lighting relay controls for the purpose of illuminating the corresponding keys.

A description will now be given of the functioning of the device just described, considering the case of a numerical acquisition carried out correctly, and then examining how erroneous acquisitions are detected and rejected, at least in the case of the most characteristic errors.

Let us consider the problem of checking a sum of 806.75, intended to be entered into a computer operand zone having a maximum capacity of 99,999.99.

In this case, the programme which is present in the programme memory M1 should contain the following instruction sequence:

- character IFE : value "sentinel";
- character ICAV : value $n = (M2 - 1) - \bar{f} - f - 1$, or $15-5-2-1 = 7$;
- character IPtD : value $f = 2$;
- character ICD : value $= 1$.

1. Phase A0.

The decoder of the first character detects the presence of the character IFE and consequently emits a state 1 to the input to the gate PIN. No signal can pass through this gate while the signal OEXT is not present at the other input to said gate. This signal, emitted by the terminal or by the computer at the time when the principal programme is interrupted, starts the functioning of the device in accordance with the following procedure: the gate PIN emits a signal distributed in four directions, as follows: (a) signal ALUR, for lighting up the display screen VR, upon which the contents of the memory M1 (instructions and identification in plain language for the acquisition to be accomplished) are displayed; (b) signal RAZ1 for instructing the general re-set to zero and erasing the contents of memory M2; (c) signal LECP, after a single delay, for enabling the last three decoders DEC of the programme instruction; (d) signal ST, after a double delay for enabling tests on the operators OPPEM, OPFIS, OPPtD, OPCEC, for initiating the start of the blind code emitter ECAV and for instructing illumination of the visualisation screen VD which displays the contents of memory M2.

Following the general re-setting to zero by the signal RAZ1, all the keys are switched to "alert".

2. Under the action of the signal LECP, the other instructions of the programme are decoded and used as follows: the values of ICAV (number of blind codes $n = 7$) and of IPtD ($f=2$) then reach the first operator OP.-PEM.

In addition, the value of ICD, that is to say 1, reaches the decoder DCID.

3. Phase A1.

Under the control of the signal ST, the emitter ECAV emits seven blind codes which are transmitted through the channels CXCS and E7 to the memory M2, into which they are introduced one after another.

Under the control of the signal ST, the first operator OP.PEM carries out the calculation: $(M2-1)-n-\bar{f} = (f)$, that is to say $15-7-2-1 = 5$.

This value is immediately transmitted to the operators OPCDD, OPpr and OPPtD.

Then the result $f$ is tested relative to 0. Since the result in this case is +5, the output P of this operator is activated and enables the decoder DCID.

4. Phase A2.

The decoder DCID having received the logic value 1 from the programme character decoder ICD, develops the output 1. This output in turn activates the gate PII(.) which emits a permanent signal (logic state 1), on the one hand towards the gates PCD1 (first input) PZ0a, P190(.), and secondly towards the output gates of the operator OPCDD and enables them. It will be seen below how, under the action of the gate PCD1, the keys TCD pass, from this instant, into an authorization state.

5. Phase A3.

Let it be assumed that the key TCD of highest rank is that of rank 6, that is to say that: ($d$ max. $= 6$).

The operator OPCDD then solves ($d$ max. $- \bar{f} = \alpha$), or $6 - 5 = +1$.

The test relative to 0 activates the output P, which in turn activates the gate ZP2. This gate then emits a permanent signal (logic state 1) which is transmitted to the gates PZ0a and P190(.). At this instant, only the decimal centering keys TCD remain authorized. In fact, the signal ST initially emitted by the gate PIN has enabled the outputs of the operators OPFIS, OPPtD and OPCEC, and at the same time OPPEM. It will be recalled that the operator OPFIS solves $\Sigma DE - \Sigma RC$ or $0 - 0 = 0$. The test therefore excites the output Z. This output activates the gates PCD1 (second input), PCD0 and PZ0$b$.

The operator OPPtD solves $\bar{f} - p - \Sigma DE + \Sigma RC$, or $5-0-0+0=5$.

The test then excites the output P. This output activates the gate PCD1 (third input). In addition, if the keys TCD are not actuated, the gate PVd does not emit any pulse; it follows that the outputs of the operator OPpr are not enabled and that the gate Zp3 also is not enabled. It therefore remains in a logic state 0. However, gate ZP3 is connected to gate PCD1 through the intermediary of an inverter, and this state 0 is transformed into logic state 1, which reaches the gate PCD1 (fourth input). From this moment, all the inputs of the gate PCD1 are excited and this gate emits a signal which reaches the input 1 of the trigger BSCD. At the same time, no other signal enters through the gate PCD0 and, under these circumstances, the bistable trigger BSCD switches to state 1.

The result is that gate PAd can no longer emit signals to the alert device ALE and that, on the contrary, the gate PVd becomes open to pass the pulses which will be emitted by the keys TCD.

It can be established in the same way that none of the other gates PZ1, P191, PCDC1, PW1, controlling the inputs 1 to the bistable guiding triggers for the keys have passed any pulses. The triggers other than trigger BSCD therefore remain in state 0 and the corresponding keys remain switched to the alert device through the intermediary of the respective alert gates PAO, PA19, PAC, PAW.

The phases just described, carried out at electronic speed, are effected with a short but less than the threshold of human perception.

By contrast, the phases which will follow are dependent upon the human operator.

6. Phase CD.

The guidance key CG is therefore at this instant is a state to be actuated independently of the row of decimal centering keys TCD.

In the particular case under consideration (acquiring of sum 806.75), the operator selects and correctly pushes down the key corresponding to the hundreds, which emits a value of $d = 3$, at the same time as a pulse which, passing through gate PVd enables the operator OPpr.

This operator solves $f - d = p$ or $5 - 3 = 2$.

The test therefore excites the output P and the gate ZP3 re-emits this permanent signal which, on the one hand enables the gates Pp and on the other hand directly reaches (without passing through an inverter) the gates PCD0, PZ0b and, after delay, PZ1z.

Since the gates Pp are enabled, the result ($p$) is transmitted in two parallel directions, that is (1) to the operator OPPtD where ($p$) enters as a negative; (2) towards the space code emitter ECE, which immediately emits $p$ times the space character, that is to say in the present case two spaces. These two space characters, passing through channels CXCS, and the E7, are stored in the memory M2, after the seven blind codes previously introduced.

In addition, the gate PCD0 being an OR gate, it is therefore traversed by the emission from the gate ZP3 and it activates the input 0 of the trigger BSCD, which instantaneously switches to the state 0, which state reaches the gate PAd. For this reason, the keys TCD are then switched towards the alert device ALE.

The gate PZOb, which is also reached by the signal from ZP3 is an AND gate, the other inputs of which continue to be activated respectively by the outputs Z of OPFIS and P of OPPtD, as we have already seen. This gate is therefore traversed and the signal reaches the input 0 of the trigger BSZ, which maintains the numerical key 0 in the prohibitive state, since the alert gate PA0+ and PA0(.) remain activated by the output 0 (signal EOZ) of the trigger BSZ and are therefore free for signals to pass.

By contrast, the gate PZ1z is not capable of being traversed, since its second input is connected to the output P of OPFIS which, as we have already seen, is still inactive at this stage.

The drive 1 of the trigger BSZ is therefore not reached and there is no conflict with the drive 0 which has just been carried out.

The gate P191 (+) being of the OR type, is traversed and activates the gate P191 at its first input. The second input of this gate is also activated by the state 0 of the trigger BS15, since the detector D15 remains in the state 0. That is to say the bits are absent in the fifteenth position of the memory M2.

All the inputs to the gate P191 being activated, and this AND gate is in turn traversed and, driving the input 1 of the trigger BS19, causes this trigger to switch to state 1. This results in the numerical keys 1 to 9 being brought into the authorization state, since the gate PIDE and the entirety of the gates PCO9, all of the AND type, become capable of being traversed by the pulses coming from these keys. In fact, the second inputs of these gates all receive the authorization signal E119 amd their third inputs are activated by the permanent signal passing through the OR gate: MP5 and emitted by the operator OPPtD, either at its output P, or at its output M, except for the instant at which it emits a signal at the output Z. This instant is very short, since the signal emitted at Z, re-entering (after delay) with a value of (−1) into the operator in question, almost immediately changes the result 0 into result (−1).

7. Phase FIS.

The keys 1 to 9 having now become authorized, and the operator is now supposed to actuate the first numerical key, that is C8 in the example described. The coding matrix C8 emits the corresponding character, which passes along the channels CXO9 and E7 as far as memory M2 and there adopts its position after the seven blind codes and the two space codes. Simultaneously, a counting pulse DE emitted by key 8 passes through the gate PIDE and reaches the operators OPFIS and OPPtD and gate PCC.

For the operator OPFIS, the test which in the first place activated the output Z now activates the output P, since the result 0 has been changed to +1. This output P is connected to the OR gate: PCDO and to the AND gates: PZ1z and PCD1. The gate PCD0 is traversed but without modifying the state of the trigger BSCD, which was already at state 0. The gate PZ1z is also traversed, since its first input is already activated by the signal coming from gate ZP3. The signal leaving the gate PZ1z passes through the OR gate: PZ1y, and then through the AND gate: PZ1, since the second input of the latter remains activated by the 0 state of the trigger BS15. The signal leaving PZ1 causes BSZ to switch to 1, resulting in the key 0 being brought into the authorization, since the AND gate: PCOO now becomes capable of being traversed, as a result of the 1 state of BSZ.

In the absence of a signal coming from the gate PCV, to which it is connected by an inverter, the gate PCDC1 is also traversed by the signal from ZP3, which causes the trigger BSCDC to switch to state 1 and consequently brings the key CDC into the authorisation state via the gate PRC.

With regard to the pulse DE which corresponds to the emission of the character 8 and which reaches the operator OPPtD, it does not modify the test output, the latter remaining positive (5−2−1+0=2). Finally, the pulse DE reaching the gate PCC, is arrested by the latter, since the output P of the operator OPCEC remains inactive.

8 Phase F.

Continuing the example described above, the operator now actuates the key 0. Having just been authorised (and illuminated if the luminous device has been installed), this key emits a pulse which passes through the AND gate: PCOO. The outgoing signal is conducted in two parallel directions, one towards the coding matrix CO which emits the corresponding character 0, which passes through the channels CXO9 and E7 as far as the memory M2, where it adopts a position after the preceding character 8; the other passing, as pulse DE, to the operators OPFIS and OPPtD and towards the gate PCC. There is no output modification of the tests and no traversing of the gate PCC, for the reasons already explained.

The same applies for each pressing of the numerical keys for the succeeding characters 6, then 7, then 5.

Two particular points should however be noted with regard to the character 6, preceding the decimal point, and the character 5 preceding enabling.

9. Emission of decimal point.

In effect, immediately after the digit 6 has been pressed, the operator OPPtD obtains a result of value 0 obtained by the equation 5−2−1−1−1+0 = 0. The test output Z being activated, it is emitted in three parallel directions as follows:

a. towards the emitter EPtD which immediately emits the service character PtD towards M2, along the path already known;

b. towards the alert gate PA0+ and PA19+, thus bringing keys 0 to 9 into prohibition state and preventing any inadvertent deleting of characters in memory M2; and c. towards the operator OPPtD itself, where this re-entry carried out in negative sign and after delay produces a decay in the result causing the test to pass from the output Z to the output M: (5−2−1−1−1+0 = −1), thus limiting the period of prohibition of the numerical keys.

10. Final enabling.

The character 5, becoming positioned in the last position of the memory M2 (the fifteenth position in the present case), causes the bits detector D15 to switch from state 0 to state 1. This state (signal E1.15) reaches the AND gate: P151 which it passes through, if as in the case of the example under consideration, the operator OPCEC is at 0. Transmitted to the input 1 of the trigger BS15, this signal causes BS15 to switch from state 0 to state 1, then continuing in three parallel directions:

a. towards the gate PADEX which is not traversed since the alert signal ALV is not present at the other input of the gate PADEX;

b. towards the OR gates: P190+ and PZOd which, themselves, are traversed and cause the bistable triggers BS 19 and BSZ to switch from state 1 to state 0, thus bringing all the numerical keys 0 to 9 into the prohibition state, via the alert gates PA0 and PA19; and c. towards the gate PW1, which is traversed because its other inputs are activated as a result of the absence of signals leaving the gates PADEX and PCV and transmitted through inverters.

An additional, optional safety feature consists in providing an additional input at the AND gate: PW1, which input would be actuated by a signal RLS emitted by the writing device on the support of the terminal only when the recording of the word upon this support has been completely finished.

The signal leaving PW1 causes the trigger BSW to switch from state 0 to state 1 which, reaching the gate PCV, brings the key TVm into the authorisation state. From this point onwards, all attempts to strike new numbers will initiate the alert, and the human operator only has the choice between action upon one of the correction keys TCDC and TEFm, or action upon the enabling key TVm, since these two categories of keys alone remain authorized.

Assuming that it has been decided to press the enabling key TVm, the pulse emitted leaving through the gate PCV is distributed in seven parallel directions, as follows:

a. towards the emitter ECV which immediately emits a "flag" character which becomes positioned in the last position of memory M2 via the known channels;

b. towards the stop instruction for the screen display devices VR and VD;

c. after delay, towards the OR gates: PW0 and PCDC0 and through the intermediary of an inverter, towards the AND gates: PW1 and PCD1,; all the keys are then prohibited;

d. towards the input 0 of the trigger BSEF, where this exists;

e. towards the controls for transfering of the contents of the buffer memory M0 into the memory M1 and of the contents of the programme support CIVD into the memory M0;

f. towards the controls for transfering the contents of memory M2 into the output buffer memory M3 and the contents of memory M3 onto the support proper of the terminal;

g. to the end of interruption control for the programme of the terminal (after double delay).

At this moment, the device according to the invention is instantaneously ready for carrying out the check of a new acquisition, if the terminal delivers to it a new order OEXT. A new programme word being present in the memory M1, a sentinel character IFE again activates the gate PIN, which is thus ready to enable the signal OEXT, as soon as it appears to instruct the commencement of a new cycle.

11. Scope of the check carried out.

One can also be sure that the number acquired (806.75) has indeed satisfied the conditions of decimal credibility. In effect, the trigger switching of the trigger BS15 to state 1 indicates that the physical striking has reached the fifteenth position of the memory, (signal E1 15) and that there is no character which is to be deleted (operator OPCEC at 0). In other words the significant striking (FS) has reached the $(m2-1)$th position of the memory M2.

For the same reasons which lead to the writing of equation A, that is $n + p + d + f + 1 = m2 - 1$, the significant striking is associated, at this instant, with the other zones of the memory M2 by the following equation B:

$$n + p + FS + 1 = m2 - 1.$$

Subtracting equation B from equation A term by term, we obtain: $(d+f) - FS = 0$ from which $(d+f) = FS$, equation C.

Equation C can be expressed in the following manner:

The theoretical decimal value estimated a priori by means of a decimal centering key, with the addition of the decimal capacity of the fractional zone determined by the programme, is identical to the decimal value of the number acquired, any deletion of digits being deducted.

In addition, it may be noted that, in equation C, the values attributed to $(d)$ and (FS) depend upon the human operator. These two values may therefore, each of them, be affected by human error, but since they result from physical and mental actions which are quite different, the equation C expresses a probability of exactness, or in other words a "credibility", of the acquiring which has been carried out and authenticated.

12. Physical detection and protection against human errors and technical failures.

As a generalisation, it can be seen that the state of the trigger BS15 expresses the verification or non-verification of equation C, the state 1 corresponding to verification and state 0 to non-verification.

Since the switching of BS15 is dependent upon the physical detection exercised by detector D15 upon the bits present in the fifteenth, that is to say the penultimate position of memory M2, this switching establishes the creditability not only of the striking carried out upon the key but also of the recordings in memory M2, including the last digit, that is to say the least significant digit (LMS).

The trigger BS15 therefore indirectly checks the functioning of the circuits as far as the memory M2.

When the equation C is not verified, the alert is initiated at an instant which differs from the acquisition, depending upon whether this equaton has become an inequality of the type $(d +f)<FS'$ (type C') or of the type $(d + f) > FS''$ (type C'').

Each of these two types of errors will now be considered.

Lack of digit

For example, as a consequence of an omission or lack of contact of the numerical keys, the significant striking is cut short with respect to the theoretical value (for example 86.75), thus giving $FS' < (d + f)$; inequation C'.

At the instant of enabling, the trigger BS15 has not yet switched to state 1 and the key TVm remains switched to alert, via the trigger BSW and the gate PAW. The action upon this key, at the end of the numerical strike, initiates the alert in this case.

It should be noted that the lack of digits thus detected may be none other than obvious if the error has consisted of actuating a TCD key of too high a rank. In this case, we then have $d'< d$, which gives $(d' + f) >$ Fs, a relationship equivalent to the inequality C' and leading to the same consequences for the alert.

Excess of digits

Let us now assume that, in error, the double zero key has been acutated instead of the zero key (or that this key has been actuated twice). The real strike becomes 800.67, that is to say the significant strike would tend to exceed the theoretical value: $FS''>(d + f)$ inequation C''.

In this case of error, the trigger BS15 switches to state 1 before the significant strike (5) has been entirely completed. This state 1 passes through the OR gates PZ0d and P190(+), and causes the triggers BSZ and BS19 to switch to state 0 and switches the numerical keys 0 to 9 to the alert, via the gates PA0 and PA19.

The alert is then initiated during the numerical strike, in this case at the instant of striking the last digit 5. The alert in its turn produces a signal ALV which reaches and passes through the AND gate: PADEX, since the other input of this gate has already been activated by state 1 of the trigger BS15. This singal then passes through the OR gate: PW0, causes BSW to switch to state 0, which reaches the AND gate: PAW, thus switching the key TVm to the alert state.

It is therefore impossible, even by an inadvertent human reflex, to authenticate the erroneous acquisition, by attempting to actuate the key PVm.

The excess digit can be none other than obvious if the error has consisted of actuating a key TCD of too low a rank, for example the tens key instead of the hundreds key. We then have $d''<d$, which gives $(d'' + f) <$ FS, an inequality equivalent to inequality C'', and leading to the same consequences for the alert.

Complementary logic

Figure 2B:
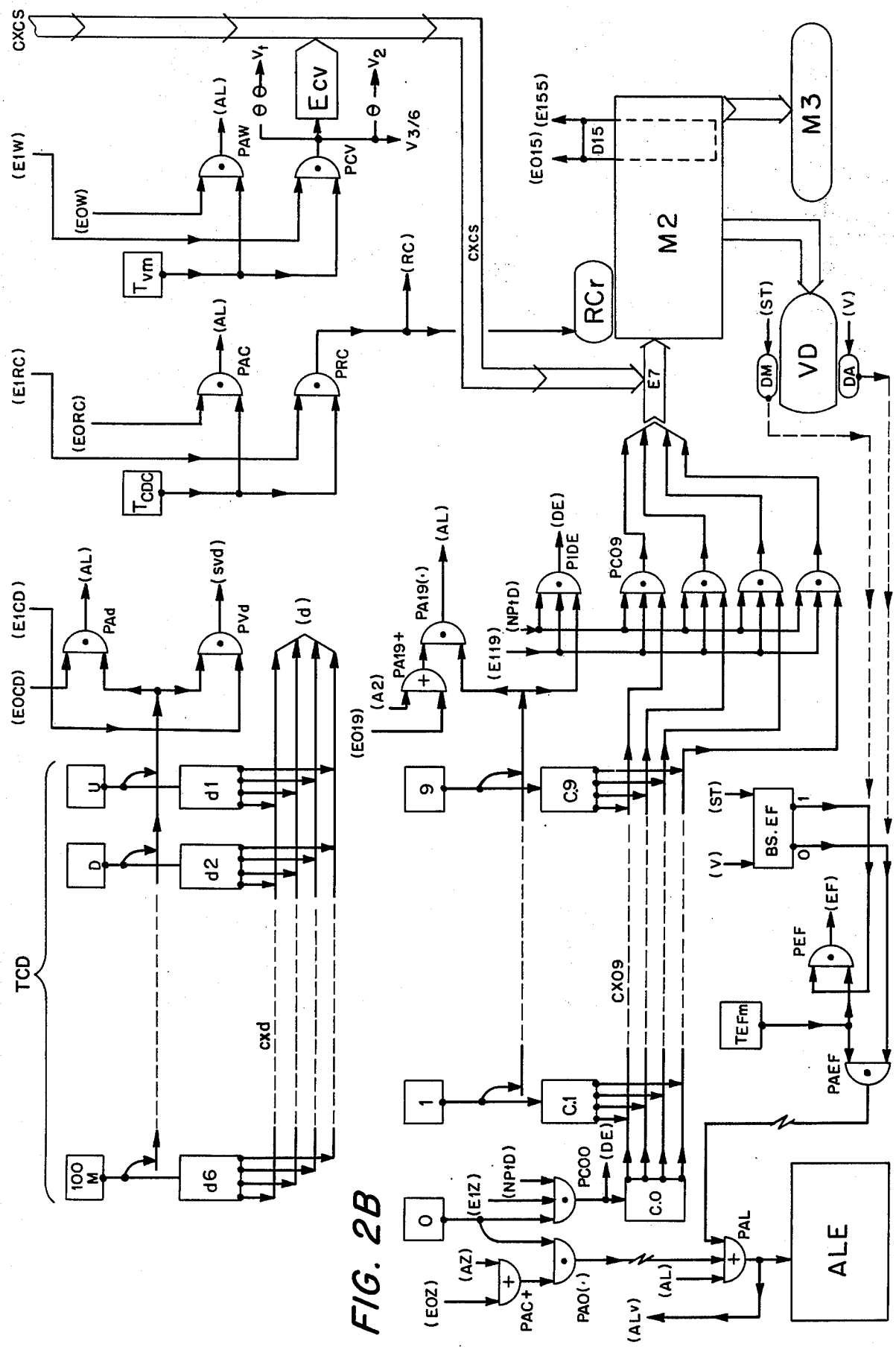

The alert is also initiated in the case of attempts to strike which are in contradiction to the complementary logics, providing especially the following safety features:

a. protection against deletion of the service characters CAV, CE, PtD by wrong manipulation of the key TCDC, by means of the circuit relating to the signal RAZ4 (FIG. 2b);

b. protection against deletion of the prefixed service characters (CE) by wrong manipulation of the keys TCD, by means of the circuits instructed by the output Z of the operator OP.pr (FIG. 2a);

c. protection against risk of premature deletion of the authenticated acquisition during the course of transfer to the terminal support, by action of the deletion key TEFm, after authentication by the key TVm, by means of the circuits relating to signal V;

d. protection against deletion of the authenticated acquisition during the course of transfer to the support, which could result from two successive authentications too close together, by means of the circuits relating to the signal (RLS);

e. protection against wrong striking of non-significant prefix 0, after the selection of a decimal centering key TCD, by means of the circuits relating to the outputs Z and P of the operator OPpr, at the output Z of the operator OPFIS and at the bistable trigger BSZ;

f. protection against wrong striking on the numerical keys before action upon one of the keys TCD, when this selection is required by the programme, this by means of the circuit relating to the gates PZ0a and P190(.);

g. protection against use of the keys TCD when the programme forbids them, this by means of the circuits relating to the gate PII(+).

All the circuits of the device according to this invention which have not been described in detail, can be easily constructed from components or apparatus freely obtainable on the market. There is given below, by way of example, information identifying such apparatus.

The entry buffer memory M0 may be a memory of the type "programmable read only memory" of the 1702A series manufactured by the company INTEL.

The memories M1 and M2 may be memories of the kind having 4 × 16 bits of the type SL5 - 4016, manufactured by the company General Instruments.

The alpha numeric display units VR and VD may be of the "self scan panel" type manufactured by Burroughs.

Finally, the various operators OPPEM — OPCEC and the emitters such as ECAN, ECE etc — may be circuits of the type "form bits binary counter" of the SN series, manufactured by Texas Instruments.

What is claimed is:

1. A device for instantaneous decimal credibility checking of digital numerical data, comprising:

a. a program memory for storing a program comprising a sequence of instruction characters, said program memory including decoders for decoding the instructions characters;

b. a principal memory for storing numerical data and service characters therein; said principal memory including a bit detector for detecting the contents of the penultimate memory position thereof;

c. a plurality of service character transmitters including blind code transmitter means for filling n memory positions in said principal memory with $n$ blind codes, space code transmitter means for filling $p$ memory positions following said $n$ memory positions in said principal memory with $p$ space codes, decimal point character transmitter means for filling a memory position in said principal memory with a decimal point character, and flag character transmitting means for filling the last memory position in said principal memory with a flag character;

d. a keyboard having a plurality of keys operable for developing control signals and numerical character signals representative of numbers; and e. a decimal positioning computer comprising decimal positioning means responsive to outputs of said program memory decoders and receptive of a keyboard control signal representative of the maximum integer position of a decimal number to be stored in said principal memory and a sequence of keyboard numerical character signals representative of the digits of said decimal number to be stored in said principal memory for enabling said decimal point character transmitter means to fill a memory position in said principal memory at the proper position of said sequence of keyboard numerical characters as said numerical characters are stored in said principal memory.

2. A device according to claim 1, wherein said decimal positioning computer comprises: six operators including a first operator OPPEM for calculating the maximum whole portion of data to be checked, a second operator OPCDD for decimal overload check, a third operator OPpr for calculating the number p of prefixed space codes to be transmitted, a fourth operator OPFIS for detecting significant initial striking, a fifth operator OPPtD for determining the decimal point character transmission, and a sixth operator OPCEC for correction during running, and a decimal instruction check detector DCID; each of said operators receiving as inputs binary values upon which the calculations are to be carried out and comprising also tests outputs for indicating calulation results respectively in excess of, equal to or less than zero, said operators each comprising means for carrying out the respective following algebraic summations of the binary values applied to their inputs; said first operator OPPEM calculating $(M2-1-n-f-1 = \bar{f})$ when f is non-zero, said second operator OPCDD calculating the value $(d\text{max} - \bar{f})$, said third operator OPpr calculating the value $(p = \bar{f} - d)$, said fourth operators OPFIS calculating the value $(\Sigma DE - \Sigma RC)$, said fifth operator OPPtD calculating the value $(\bar{f} - p - \Sigma DE + \Sigma RC)$, said sixth operator OPCEC calculating the value $(\Sigma RC - \Sigma DE' = \gamma)$ wherein DE' equals zero in the calculation if $\gamma$ equals zero and equals one if $\gamma$ is other than zero, the decimal instruction check detector DCID being connected to said decoders to receive an authorized decimal positioning instruction, a plurality of bistable trigger circuits, a plurality of logic gates for connecting the tests outputs of said operators and of said detector to the inputs of said bistable trigger circuits for controlling the outputs thereof to develop keyboard enabling and disabling signals, the value p calculated by said third operator OPpr being applied to the space code transmitter means for determining the number p of space codes, the zero test output of said fifth operator OPPtD being connected to the decimal point character transmitter means for determining the memory position in said principal memory filled by a decimal point character; and wherein M2−1 is a fixed constant having a value equal to one less than the capacity of the principal memory, f is a number of memory positions reserved for the fractional portion of data to be checked, and dmax is the maximum number of memory positions reserved for the data to be checked.

3. A device according to claim 2, wherein said plurality of bistable trigger circuits comprises, a first decimal check bistable trigger BSCD, a second bistable trigger BSZ for enabling the keyboard zero key, a third bistable trigger BS19 for enabling the keyboard numerical keys 1 to 9, a fourth bistable trigger BSCDC for enabling the keyboard TCDC key for correcting the last character transmitted by the keyboard, a fifth bistable trigger BSW for enabling the keyboard word authenticating keys TVm and TVSq, and a sixth bistable trigger BS15 having a pair of input gates P150, P151 and respectively receiving at its two inputs through said input gates P150, P151 the output states 0 and 1 of said detector for detecting the contents of the penultimate memory position thereby effecting detection of the presence or absence of bits in the penultimate position of said principal memory, and a logic circuit cooperative with said trigger circuits and comprising pairs of gates each having two inputs, of which the first inputs are connected by a common line to the corresponding keys of the keyboard and of which the second inputs are connected respectively to the 0 and 1 outputs of respective ones of said trigger circuits, the output of a gate which is activated by the zero state of the corresponding trigger emitting an alert signal AL, while the output of a gate activated by the authorization state 1 emits a specific signal dependent upon the category of the keys concerned, whereby the totality of keys comprising said keyboard are controlled.

* * * * *